US006837997B2

(12) United States Patent
Wilkinson

(10) Patent No.: US 6,837,997 B2
(45) Date of Patent: Jan. 4, 2005

(54) DISPOSAL OF SEDIMENT FROM POND OR LAGOON AT PETROLEUM REFINERY

(75) Inventor: John B. Wilkinson, Ashburn, VA (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 0 days.

(21) Appl. No.: 10/266,802

(22) Filed: Oct. 8, 2002

(65) Prior Publication Data

US 2004/0065612 A1 Apr. 8, 2004

(51) Int. Cl.[7] .................................................. C02F 3/00
(52) U.S. Cl. ...................... 210/601; 210/623; 210/631; 210/197; 210/532.1; 210/513; 210/538
(58) Field of Search ................. 210/607, 608, 210/620–624, 747, 768, 800, 195.1, 197, 538, 532.1, 601, 631, 513

(56) References Cited

U.S. PATENT DOCUMENTS

| 3,968,036 A | | 7/1976 | Liles et al. | |
| 4,292,176 A | * | 9/1981 | Grutsch et al. | ............. 210/616 |
| 4,595,508 A | | 6/1986 | Wolfe et al. | |
| 4,857,185 A | * | 8/1989 | Desjardins | .................. 210/150 |
| 5,288,391 A | | 2/1994 | Biceroglu | |
| 5,736,049 A | * | 4/1998 | Bundy et al. | ................ 210/620 |
| 5,906,750 A | * | 5/1999 | Haase | ......................... 210/727 |

OTHER PUBLICATIONS

Bush, "Refinery wastewater treatment and reuse," Chemical Engineering pp 113–118 (Apr. 12, 1976).
Dialog abstract of Chin, "Evaluation of Treatment Efficiency of Processes for Petroleum Refinery Wastewater." (1994).
Abstract of Ramalho, "Design of Aerobic Treatment Units–2. Aerated Lagoons and Wastewater Stabilization Ponds." (1979).
Abstract of Bhagat, " WET program converts oil residue." (Jun. 1980).
Abstract of Weiss et al., "A Review of the Literature of 1968 on Wastewater and Water Pollution Control." (Jun. 1969).

* cited by examiner

*Primary Examiner*—Chester T. Barry
(74) *Attorney, Agent, or Firm*—Malcolm D. Keen

(57) ABSTRACT

Method and system for removing accumulated sediment at the bottom of a waste pond or lagoon of a wastewater treatment plant for a petroleum refinery. The system comprises a primary oil separation stage for separating hydrocarbons from the wastewater stream by gravity, a secondary oil removal stage and a biological treatment stage downstream of the secondary oil removal stage. A portion of the sediment from the bottom of the waste pond or lagoon is passed to the secondary oil removal stage and/or the biological treatment stage for processing with the refinery wastewater being treated in these stages.

32 Claims, 1 Drawing Sheet

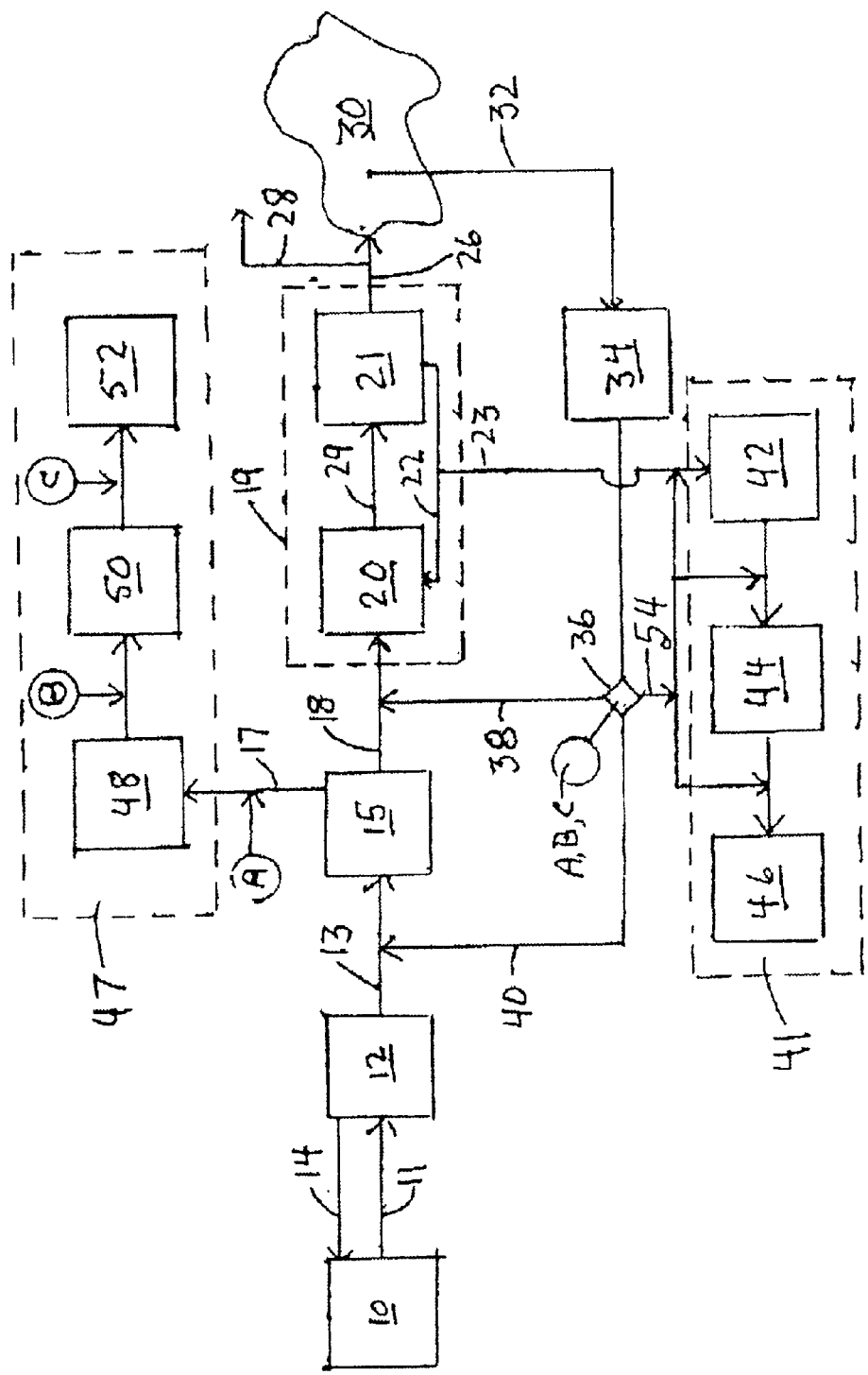
FIGURE

DISPOSAL OF SEDIMENT FROM POND OR LAGOON AT PETROLEUM REFINERY

BACKGROUND

Disclosed herein is a method and system for disposal of accumulated sediment at the bottom of a waste pond or lagoon of a wastewater treatment system for a petroleum refinery.

There are an increasing number of governmental regulations relating to the accumulation of sediment in refinery wastewater ponds and/or lagoons. Many petroleum refineries have older wastewater ponds and lagoons with substantial accumulated quantities of sediment. Removal and disposal or containment of this sediment using currently available methods is costly.

SUMMARY

The preferred forms disclosed herein respond to the need for disposing of accumulated sediment by providing a method and system that permit efficient and cost-effective operation over several years during the processing and disposing of such sediment.

In accordance with a broad aspect, there is provided a method and system for removing accumulated sediment at the bottom of a waste pond or lagoon of a wastewater treatment plant for a petroleum refinery. The plant comprises a primary oil separation stage, and a plurality of stages downstream of the primary oil removal stage for removing additional hydrocarbons, other organic materials and suspended solids from the wastewater stream. The preferred forms disclosed herein provide for withdrawing the sediment from the bottom of the pond or lagoon and passing the sediment to one or more of the plurality of stages downstream of the primary oil removal stage, and for processing the sediment with the refinery wastewater being treated in the system.

Suitable downstream stages include a secondary oil removal stage downstream of the primary oil separation stage and a biological treatment stage downstream of the secondary oil removal stage. In a preferred form, the sediment from the bottom of the waste pond or lagoon is passed to the secondary oil removal stage and/or the biological treatment stage for processing with the refinery wastewater.

In accordance with a specific aspect, the wastewater stream from the petroleum refinery is fed to a primary oil separation stage to separate hydrocarbons from the wastewater stream by gravity and to provide a hydrocarbon-reduced wastewater stream. The separated hydrocarbons are returned to the refinery, and the hydrocarbon-reduced wastewater stream is fed to a secondary oil separation stage (i) for separating additional hydrocarbons and removing suspended solids from the hydrocarbon-reduced wastewater stream and (ii) for providing a secondary oil separation stage wastewater output stream. The separated additional hydrocarbons and the removed solids are processed as waste solids and oils for disposal. This specific aspect further comprises feeding the secondary oil separation stage wastewater output stream to a biological treatment stage (i) for contact with microorganisms to remove organic materials by biological synthesis and oxidation reactions and (ii) for providing a biological treatment stage wastewater output stream for disposal in accordance with environmental standards. This specific aspect also provides that sediment at the bottom of the waste pond or lagoon is withdrawn and passed to the secondary oil separation stage and/or the biological treatment stage, and that the sediment so passed is processed with the hydrocarbon-reduced stream and/or with the secondary oil separation stage output stream.

Also provided for is the controlling of the rate of sediment withdrawn from the bottom of the waste pond or lagoon to a sufficiently low level to avoid adversely affecting treatment of the wastewater stream. This is accomplished by limiting the feeding rate of passed sediment to a very low percentage of the current wastewater flow. The sediment is then processed as a very minor portion of the current refinery wastewater stream and is disposed of, under current regulations or guidelines, with waste solids and oil from the secondary oil separation stage or with waste activated sludge from the biological treatment stage.

The sediment is withdrawn from the bottom of the waste pond or lagoon and passed to the secondary oil separation stage and/or the biological treatment stage at a rate that enables all of the sediment from the bottom of the waste pond or lagoon to be processed in less than 10 years.

A preferred form provides that the quantity of withdrawn sediment passed to the secondary oil separation stage and/or the biological treatment stage is less than 5.0% by volume of the wastewater stream from the refinery, and specifically is from 0.1% to 5.0% by volume of the wastewater stream from the refinery.

The long term controlled processing of sediment from older ponds to components of a modernized refinery wastewater treatment system, in accordance with a preferred form, provides for removing accumulated sediment in older ponds and lagoons in a very efficient and cost effective manner. Also, if such pond or lagoon remains in use after removal of sediment, the plant will have an increase in total volume for wastewater processing and treatment.

As used herein, the term "sediment" is defined as the matter that settles to the bottom of a wastewater pond or lagoon and includes but is not limited to sludge, oily materials, bacteria, algae and other decayed organic matter.

The term "sludge" is used herein to define biosolids remaining after secondary or tertiary treatment of the wastewater.

As may be appreciated by those skilled in the art, the accumulated sediment in the wastewater pond or lagoon that is withdrawn and passed to the refinery wastewater treatment system, may or may not have been produced by the treatment system presently in place. The treatment system that produced the sediment may have been modernized or otherwise updated in whole or in part to form the current system.

BRIEF DESCRIPTION OF THE DRAWING

The FIGURE presents a flow diagram of a petroleum refinery wastewater treatment system for removal and disposal of accumulated sediment at the bottom of a waste pond or lagoon in accordance with a preferred form.

DESCRIPTION OF SPECIFIC EMBODIMENTS

With reference to the FIGURE, a wastewater stream 11 from a refinery 10 is fed to a primary oil separation stage 12 for separating hydrocarbons from the wastewater stream 11 by gravity and for providing a hydrocarbon-reduced wastewater stream 13, and for returning the separated hydrocarbons 14 to the refinery 10. There is a significant amount of recoverable oil in refinery wastewater, and most of the recoverable oil is separated in the primary separation stage 12.

The primary oil separation stage 12 is typically a gravity oil separator, such as an American Petroleum Institute (API) oil separator, or parallel plate or tilted plate separators. These separators are usually operated without use of any chemicals or coagulants.

The API gravity separator is sized to allow most of the free oil to float to the surface, and the heavier solids to fall to the bottom. These separators are normally an integral part of a typical oil refinery wastewater treatment plant, due to the significant amount of recoverable oil in refinery wastewater. "API Manual on Disposal of Refinery Wastes, Volume of Liquid Wastes," Chapters 5 and 6, API, Washington, D.C., discloses details of suitable API separators for use herein, and is hereby incorporated herein by reference.

A tilted-plate separator is another type of gravity oil separator suitable for use in the primary oil separation stage 12. This unit is made up of one or more modules consisting of several tilted corrugated plates, tilted for example at a 45° angle. As the water flows between the plates, the oil droplets collect on the underside and move to the top of the module.

Gravity oil separators are generally long, narrow chambers designed to obtain specific horizontal and vertical velocities to facilitate oil separation by taking advantage of the difference in densities of oil and water. The units are equipped with oil-skimming devices for oil removal. Several parameters determine the effectiveness of the API separator, including water temperature, density and size of the oil droplets, and the type of solids in the water. However, only free oil will be separated. Emulsified oil cannot be removed in a gravity oil separator.

The hydrocarbon-reduced wastewater stream 13 is fed to a secondary oil separation stage 15 for separating additional hydrocarbons, including emulsified oil, and for removing finer suspended solids from the hydrocarbon-reduced wastewater stream 13. The separated additional hydrocarbons and the removed solids 17 are processed as waste solids and oil for disposal in accordance with environmental standards. The secondary oil separation stage 15 also provides a wastewater output stream 18.

The secondary oil separation stage 15 suitability includes a process for destabilizing the emulsions with de-emulsifying agents. An emulsion is a mixture of two immiscible liquids, one dispersed throughout the other as very fine droplets. The process by which oil emulsions are broken involves neutralization of oil droplet charges by floc formation with a charge opposite that of the oil, absorption of the oil by the floc, and entrapment of the oil as the floc grows and builds up around the oil droplet. Depending on the effectiveness of a particular coagulant on wastewater from a refinery, various coagulants such as organic polyelectrolytes, ferrous sulfate, ferric chloride, lime, or others are used to de-emulsify the wastewater. A Dissolved Air Flotation (DAF) process with the addition of coagulants is widely used for this application. The vertical or rise velocity of the oil globules depends on the differential density between oil and liquid. This is increased by introduction of air bubbles into the system that attach to the oil globules, and the agglomerates, being lighter, rise to the surface.

A typical DAF unit for use in the secondary oil separation stage 15 is disclosed in "Encyclopedia of Physical Science and Technology", 2nd Ed, Vol. 17, p. 452, Academic Press Inc., Harcourt Brace Jovanovich. FIG. 5 on page 452 and the description thereof in this encyclopedia is hereby incorporated herein by reference. In this DAF unit, the hydrocarbon-reduced stream 13 from the primary oil separation stage 12 (e.g., API oil separator) is fed into a flocculation tank to destabilize the emulsion, and then to a flotation tank to float the destabilized oily solids. When pressure is released in the DAF unit, the air forms minute bubbles that attach to the oil particles in suspension bringing them to the surface where they are skimmed from the flotation tank by a sludge removal mechanism. Sludge from the DAF unit is captured by floatation or filter units and is sent to a first solid waste disposal stage 47 via a line 17. The wastewater output stream 18 is another effluent of the DAF unit.

Induced Air Floatation (IAF) and Media Filtration units are other devices that are suitable for use in the secondary oil separation stage 15.

In the IAF process, air is induced into the wastewater by mechanical means. The induced air forms bubbles, which rise toward the surface of the wastewater. As the bubbles move upward, they contact and become attached to particulate contaminants to promote flotation of the contaminants, which are then skimmed (or decanted) from the surface. As in the DAF process, the bubbles in the IAF process function to increase the vertical velocity of the particulate contaminants in accordance with Stoke's Law.

Suitable Media Filtration units are disclosed in Wastewater Engineering: Treatment, Disposal, Reuse, Second Edition, Metcalf & Eddy, Inc., (Revised by George Tchobanoglous), ISBN 0-07-041677-X.

The solid waste disposal stage 47 processes hydrocarbons and suspended solids removed from the wastewater in the secondary oil removal stage 15, and typically includes a gravity separator 48 and a dewatering device 50 for preparing the sediment for disposal 52, for example in a landfill, in a landfarm or in an incinerator.

The wastewater output stream 18 of the secondary oil separation stage 15 is fed to a biological treatment stage 19 for contact with microorganisms to remove organic materials, including nonrecoverable oils, by biological synthesis and oxidation reactions.

The biological treatment stage 19 includes a biological treatment aerator 20 and a clarifier 21. The aerator 20 contains a high concentration of microorganisms for sustaining a biologic treatment by providing the microorganisms with an oxygen supply and by intimate contact with the wastewater output stream 18. The microorganisms remove the organic materials by the biochemical synthesis and oxidation reactions.

The converted organic matter and other suspended solids are transferred via a conduit 29 from the biological treatment aerator 20 to the clarifier or sedimentation tank 21 where suspended solids are removed. A portion of the activated sludge is recycled by a conduit 22 from the clarifier 21 to the biological treatment aerator 20 to maintain the concentration of microorganisms required for biological treatment. Excess active sludge from the clarifier 21 is sent to a second solid waste disposal stage 41 via a line 23. The solid waste disposal stage 41 processes the excess active sludge removed from the clarifier 41, and typically includes a gravity separator 42 and a dewatering device 44 for preparing the sediment for disposal 46, for example in a landfill, in a landfarm or in an incinerator. Alternatively, the excess active sludge from the clarifier 21 can be sent to the first solid waste disposal stage 47 for processing and disposal.

The clarifier 21 produces a wastewater output stream 26 for disposal. This output stream 26 may be sent to a pond or lagoon 30 or otherwise processed 28 in accordance with governmental and corporate environmental standards that are designed to avoid adverse environmental consequences.

The wastewater output stream 26 may be returned to the refinery and/or discharged from the wastewater treatment system if of sufficient quality for those purposes. The wastewater output stream that is returned to the refinery may be used as makeup cooling water.

The pond or lagoon 30 is an option for sediment collection and disposal of the wastewater output stream 26. Oxygen, applied either directly or created by photosynthesis of algae, is used by the bacteria to oxidize the organics in the wastewater. The sludge, which settles to the bottom the pond or lagoon 30, consists of organisms and other particulates not degraded in the biologic process.

As discussed above, a preferred form provides for disposal of sediment from the bottom of the waste pond or lagoon 30. The sediment S is withdrawn through a conduit 32 and passed to the secondary oil separation stage 15 and/or to the biological treatment stage 19 where the sediment S is processed with the hydrocarbon-reduced stream 13 and/or with the secondary oil separation stage output stream 18.

Contemplated is an optional pretreatment 34 of the sediment S, as necessary. Such pretreatment may include the application of heat, or pH, pressure, biological or chemical modification to optimize the process.

When the sediment S is passed to the secondary oil separation stage 15, the sediment S is captured along with sediment from the stream 13 by the floatation or filter units and processed for disposal as a component of the removed solids 17. Alternatively, sediment S from the bottom of the waste pond or lagoon 30 that is passed to the biological treatment stage 19 is partially biologically treated and incorporated into the mixed liquor suspended solids in the aerator 20 and clarifier 21 for disposal with the waste activated sludge 23.

The withdrawal rate of sediment passed through the conduit 32 from the bottom of the waste pond or lagoon 30 is held to a sufficiently low level to avoid adversely affecting treatment of the current wastewater stream by the secondary oil separation stage 15 or the biological treatment stage 19. This low level is monitored and controlled by a controller 36 that limits the withdrawal rate of the passed sediment to a very low percentage of the current wastewater flow as represented by the hydrocarbon-reduced stream 13 and the output stream 18 of the secondary oil separation stage 15. It is contemplated that the withdrawn sediment S can be directed to either one of or to both of the stages 15, 19. If conditions warrant, the controller 36 can direct part or all of the withdrawn sediment S via line 54 or A, B, C to the first and/or the second solid waste disposal stages 41, 47.

The controller 36 chooses the most economical disposition for the withdrawn pond/lagoon sediment S, and may be manually operable monitoring and control devices, or may be partially or fully automated. In practice, the major part of disposition decision may be made when designing the sediment removal system and one or more options are installed.

The withdrawn sediment S from the bottom of the waste pond or lagoon 30 is passed to the secondary oil separation stage 15 and/or the biological treatment stage 19 at a rate such that all of the sediment S from the bottom of the waste pond or lagoon 30 is processed in less than 10 years. Suitably the quantity of sediment S withdrawn and passed is less than 5.0% by volume of the wastewater stream 11 from the refinery 10, and specifically is from 0.1% to 5.0% by volume of the wastewater stream 11 from the refinery 10.

Although the above has been described with reference to preferred forms, it is to be understood that modifications and variations may be utilized without departing from the spirit and scope thereof, as those skilled in the art will readily understand. Such modifications and variations are to be considered, provided they come within the scope of the appended claims and their equivalents.

What is claimed is:

1. A method of removing accumulated sediment from the bottom of a pond or lagoon used for sediment collection and disposal of a treated wastewater output stream of a system for treating a petroleum refinery wastewater stream; the system comprising a primary oil separation stage, and a plurality of stages including a biological treatment stage downstream of the primary oil removal stage for removing additional hydrocarbons, other organic materials and suspended solids from the wastewater stream after it has passed through the primary oil separation stage, to produce the treated wastewater output stream; the method comprising the steps of:

a) withdrawing sediment from the bottom of the pond or lagoon containing treated wastewater;

b) passing the withdrawn sediment to one or more of the plurality of stages downstream of the primary oil separation stage; and c) processing the sediment with the refinery wastewater being treated in the system.

2. The method of claim 1, wherein the plurality of stages comprise a secondary oil removal stage downstream of the primary oil separation stage and a biological treatment stage downstream of the secondary oil removal stage.

3. The method of claim 1, wherein said sediment withdrawing step is conducted at a rate effective to process all of the sediment in the waste pond or lagoon in less than 10 years.

4. The method of claim 2 wherein said sediment withdrawing step is conducted at a rate adequate for avoiding a reduction in the processing effectiveness on the refinery wastewater being treated in the secondary oil removal stage and/or the biological treatment stage.

5. The method of claim 1 wherein the quantity of sediment passed to one or more of the plurality of stages is less than 5.0% by volume of the wastewater stream from the refinery.

6. The method of claim 1 wherein the quantity of sediment passed to one or more of the plurality of stages is from 0.1% to 5.0% by volume of the wastewater stream from the refinery.

7. A method of removing accumulated sediment at the bottom of a waste pond or lagoon used for sediment collection and disposal of a treated wastewater output stream of a wastewater treatment system for a petroleum refinery comprising the steps of:

a) feeding a refinery wastewater stream to a primary oil separation stage for separating hydrocarbons from the wastewater stream by gravity and for providing a hydrocarbon-reduced wastewater stream;

b) returning the separated hydrocarbons to the refinery;

c) feeding the hydrocarbon-reduced wastewater stream to a secondary oil separation stage (i) for separating additional hydrocarbons and removing suspended solids from the hydrocarbon-reduced wastewater stream and (ii) for providing a secondary oil separation stage wastewater output stream;

d) feeding the secondary oil separation stage wastewater output stream to a biological treatment stage (i) for contact with microorganisms to remove organic materials by biological synthesis and oxidation reactions and (ii) for providing a biological treatment stage wastewater output stream for disposal in the waste pond or lagoon;

e) withdrawing sediment from the bottom of the waste pond or lagoon;

f) passing the withdrawn sediment to the secondary oil separation stage and/or the biological treatment stage; and g) processing the withdrawn sediment with the hydrocarbon-reduced wastewater stream and/or with the secondary oil separation stage wastewater output stream.

8. The method of claim 7 wherein said sediment withdrawing step is conducted at a rate effective to process all of the sediment in the waste pond or lagoon in less than 10 years.

9. The method of claim 7 wherein said sediment withdrawing step is conducted at a rate adequate for avoiding a reduction in the processing effectiveness on the current refinery wastewater being treated in the secondary oil removal stage and/or the biological treatment stage.

10. The method of claim 7 wherein the quantity of sediment passed to the secondary oil separation stage and/or the biological treatment stage is less than 5.0% by volume of the wastewater stream from the refinery.

11. The method of claim 7 wherein the quantity of sediment passed to the secondary oil separation stage and/or the biological treatment stage is from 0.1% to 5.0% by volume of the wastewater stream from the refinery.

12. The method of claim 7 wherein the biological treatment stage wastewater output stream is (i) returned to the refinery and/or (ii) sent to the waste pond or lagoon and/or (iii) discharged from the wastewater treatment plant.

13. The method of claim 12 wherein the biological treatment stage wastewater output stream is at least in part returned to the refinery as makeup cooling water.

14. A system for removing accumulated sediment from the bottom of a waste pond or lagoon used for sediment collection and disposal of a treated wastewater output stream of a wastewater treatment plant for a petroleum refinery comprising:

a) a primary oil separation stage;

b) a plurality of stages downstream of said primary oil removal stage for removing additional hydrocarbons, other organic materials and suspended solids from the wastewater stream; and c) means for withdrawing the sediment from the bottom of the waste pond or lagoon for passing to one or more of said plurality of stages to process the sediment with the refinery wastewater being treated in the system.

15. The system of claim 14 wherein said plurality of stages comprise a secondary oil removal stage downstream of said primary oil separation stage and a biological treatment stage downstream of said secondary oil removal stage.

16. The system of claim 14 wherein said withdrawing means passes the sediment to one or more of said plurality of stages at a rate for processing all of the sediment in the waste pond or lagoon in less than 10 years.

17. The system of claim 15 wherein said withdrawing means passes the sediment to one or more of said plurality of stages at a rate adequate for avoiding a reduction in the processing effectiveness on the current refinery wastewater being treated in said secondary oil removal stage and/or said biological treatment stage.

18. The system of claim 14 wherein the quantity of withdrawn sediment passed to one or more of said plurality of stages is less than 5.0% by volume of the wastewater stream from the refinery.

19. The system of claim 14 wherein the quantity of withdrawn sediment passed to one or more of said plurality of stages is from 0.1% to 5.0% by volume of the wastewater stream from the refinery.

20. The system of claim 15 further comprising at least one solid waste disposal stage downstream of said secondary oil removal stage for preparing solid waste removed from the wastewater in the secondary oil removal stage for disposal in a landfill, in a landfarm or in an incinerator.

21. The system of claim 20 wherein said solid waste disposal stage comprises a gravity separator and a dewatering device for preparing the solid waste for disposal.

22. The system of claim 15 further comprising a solid sludge waste disposal stage for processing an active sludge removed from the biological treatment stage.

23. A system for removing accumulated sediment from the bottom of a waste pond or lagoon used for sediment collection and disposal of a treated wastewater output stream of a wastewater treatment plant at a petroleum refinery comprising:

a) a primary oil separation stage (i) for separating hydrocarbons from a refinery wastewater stream by gravity and (ii) for providing a hydrocarbon-reduced wastewater stream;

b) means for returning the separated hydrocarbons to the refinery;

c) a secondary oil separation stage (i) for separating additional hydrocarbons and removing suspended solids from the hydrocarbon-reduced wastewater stream and (ii) for providing a secondary oil separation stage wastewater output stream;

d) a biological treatment stage (i) for contacting the secondary oil separation stage wastewater output stream with microorganisms to remove organic materials by biological synthesis and oxidation reactions and (ii) for providing a biological treatment stage wastewater output stream for disposal in the waste pond or lagoon; and e) means for withdrawing sediment from the bottom of the waste pond or lagoon containing the treated wastewater output stream and passing to said secondary oil separation stage and/or said biological treatment stage for processing with the hydrocarbon-reduced wastewater stream and/or with the secondary oil separation stage wastewater output stream.

24. The system of claim 23 wherein said withdrawing means passes the sediment to said secondary oil separation stage and/or said biological treatment stage at a rate for processing all of the sediment in the waste pond or lagoon in less than 10 years.

25. The system of claim 23 wherein said withdrawing means passes the sediment to said secondary oil separation stage and/or said biological treatment stage at a rate for avoiding a reduction in the processing effectiveness on the current refinery wastewater being treated in said secondary oil removal stage and/or said biological treatment stage.

26. The system of claim 23 wherein the quantity of withdrawn sediment passed to said secondary oil separation stage and/or said biological treatment stage is less than 5.0% by volume of the wastewater stream from the refinery.

27. The system of claim 23 wherein the quantity of withdrawn sediment passed to said secondary oil separation stage and/or said biological treatment stage is from 0.1% to 5.0% by volume of the wastewater stream from the refinery.

28. The system of claim 23 further comprising at least one solid waste disposal stage downstream of said secondary oil removal stage for preparing the solid waste removed from the wastewater in the secondary oil removal stage for disposal in a landfill, in a landfarm or in an incinerator.

29. The system of claim 28 wherein said solid waste disposal stage comprises a gravity separator and a dewatering device for preparing the solid waste removed from the wastewater in the secondary oil removal stage for disposal.

30. The system of claim 23 further comprising a solid sludge waste disposal stage for processing an active sludge removed from the biological treatment stage for disposal.

31. The system of claim 23 wherein said biological treatment stage wastewater output stream is (i) returned to the refinery and/or (ii) sent to the waste pond or lagoon and/or (iii) discharged from the wastewater treatment system.

32. The system of claim 31 wherein the biological treatment stage wastewater output stream Is at least in part returned to the refinery as makeup cooling water.

* * * * *